(12) United States Patent
Wu et al.

(10) Patent No.: US 9,965,861 B2
(45) Date of Patent: May 8, 2018

(54) METHOD AND SYSTEM OF FEATURE MATCHING FOR MULTIPLE IMAGES

(71) Applicant: INTEL CORPORATION, Santa Clara, CA (US)

(72) Inventors: Junkai Wu, Shanghai (CN); Yong Jiang, Shanghai (CN); Yi Wu, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 434 days.

(21) Appl. No.: 14/660,839

(22) Filed: Mar. 17, 2015

(65) Prior Publication Data

US 2016/0188994 A1    Jun. 30, 2016

Related U.S. Application Data

(60) Provisional application No. 62/097,437, filed on Dec. 29, 2014.

(51) Int. Cl.
| | |
|---|---|
| *G06K 9/46* | (2006.01) |
| *G06T 7/00* | (2017.01) |
| *G06K 9/62* | (2006.01) |
| *G06T 7/593* | (2017.01) |

(52) U.S. Cl.
CPC .......... *G06T 7/0075* (2013.01); *G06K 9/4642* (2013.01); *G06K 9/6211* (2013.01); *G06T 7/593* (2017.01); *G06T 2207/10012* (2013.01); *G06T 2207/20021* (2013.01)

(58) Field of Classification Search
CPC ............... G06T 7/0075; G06T 7/593; G06T 2207/20021; G06T 2207/10012; G06K 9/6211; G06K 9/4642
See application file for complete search history.

(56) References Cited

U.S. PATENT DOCUMENTS

| | | | |
|---|---|---|---|
| 6,674,892 B1 | 1/2004 | Melen | |
| 2005/0271264 A1* | 12/2005 | Ito | G06T 5/006 |
| | | | 382/154 |
| 2008/0285654 A1 | 11/2008 | Cai et al. | |
| 2009/0284584 A1 | 11/2009 | Wakabayashi et al. | |
| 2011/0115886 A1 | 5/2011 | Nguyen et al. | |

FOREIGN PATENT DOCUMENTS

| | | |
|---|---|---|
| WO | 0004508 | 1/2000 |

OTHER PUBLICATIONS

International Search Report and Written Opinion, dated Apr. 1, 2016, for PCT Patent Application No. PCT/US2015/063438.

\* cited by examiner

*Primary Examiner* — Chan Park
*Assistant Examiner* — Elisa Rice
(74) *Attorney, Agent, or Firm* — Green, Howard & Mughal LLP

(57) ABSTRACT

A system, article, and method of feature matching for multiple images.

15 Claims, 9 Drawing Sheets

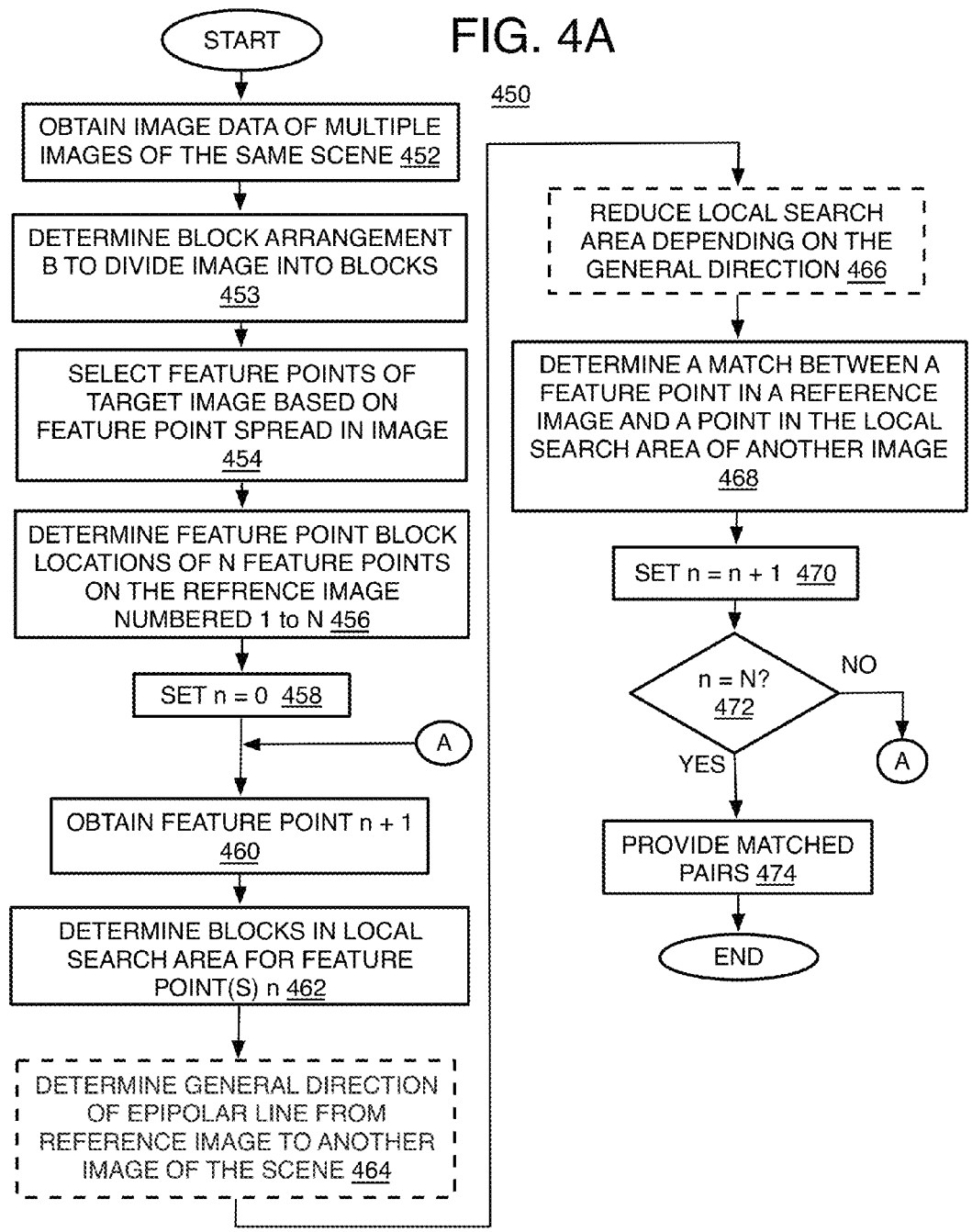

FIG. 15
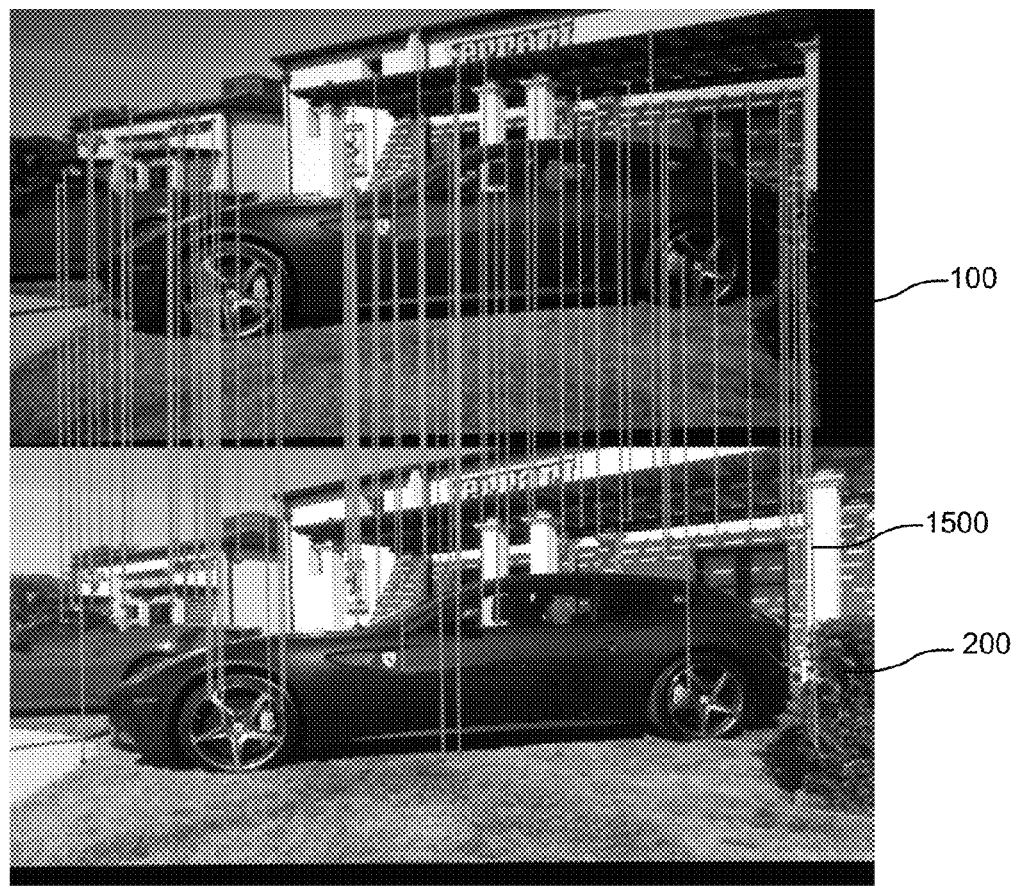
FIG. 16
FIG. 17
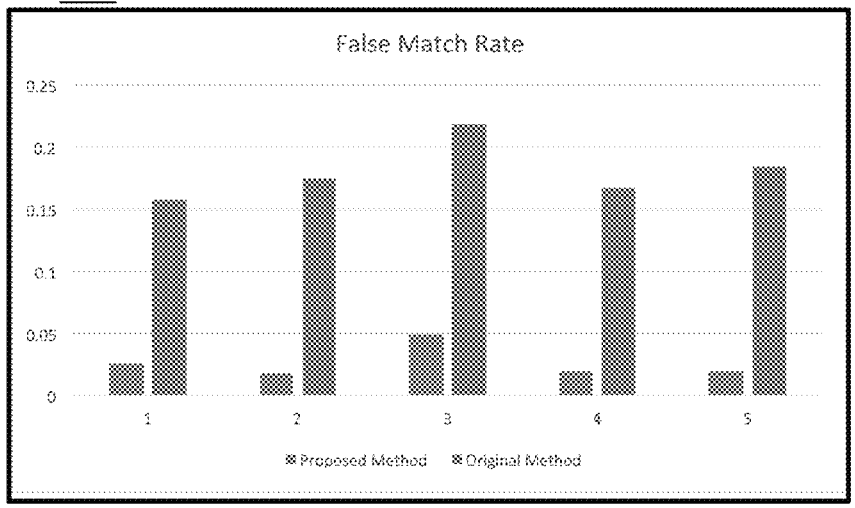

METHOD AND SYSTEM OF FEATURE MATCHING FOR MULTIPLE IMAGES

CROSS-REFERENCE TO RELATED APPLICATION

This application claims the benefit of U.S. Provisional Application No. 62/097,437, filed Dec. 29, 2014, which is incorporated herein for all purposes.

BACKGROUND

Camera arrays, which may be provided on tablets or smartphones for example, may be provided to capture multiple images of the same scene except from different angles. These images can then be used to generate a 3D space or depth map, and accurately locate objects from the scene and into the 3D space. This is performed so that objects in the scene, or distances between objects in the scene (or from the camera to the object) can be measured, for computer vision, artificial intelligence, object recognition, and otherwise whenever it is desirable to know the size, position, or identity of an object.

Feature matching (or feature point matching) is used to match the features of an object (such as a corner or an edge of an object) from one image to another image captured by a camera array. Feature point matching is widely used in camera calibration to set the proper position or orientation for each camera in the array or on the device with the array, and thereafter, to set an accurate final point location on an object by using the same corresponding feature point from multiple images. Basically, for a feature point from a reference camera image, a matching algorithm finds the corresponding feature point in the other camera images regardless of changes in light, scale, and other transformations. Many of the conventional methods for matching feature points are often too slow or inaccurate especially for mobile devices.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4A is a detailed flow chart of feature matching for a camera array;

FIGS. 15-16 is a diagram showing the feature point alignment from the first picture of FIG. 1 to the second picture of FIG. 2 except here determined by the feature matching process described herein;

FIG. 17 is a table comparing conventional and present false match rates;

DETAILED DESCRIPTION

Figure 1:
FIG. 1 is a first picture of a scene with an object taken from a camera in an array.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets with multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide feature matching for multiple images.

As mentioned above, feature matching (or feature point matching) may be used to match the same feature point on an object in multiple captured images from multiple cameras in a camera array. This is performed to calibrate the position and/or orientation of one or more of the cameras in the array, and ultimately to generate a 3D depth space or map, measure and/or identify objects in the 3D space, and so forth, for many different applications.

Figure 2:
FIG. 2 is a second picture of the same scene with the object taken from another camera in the array.
Figure 3:
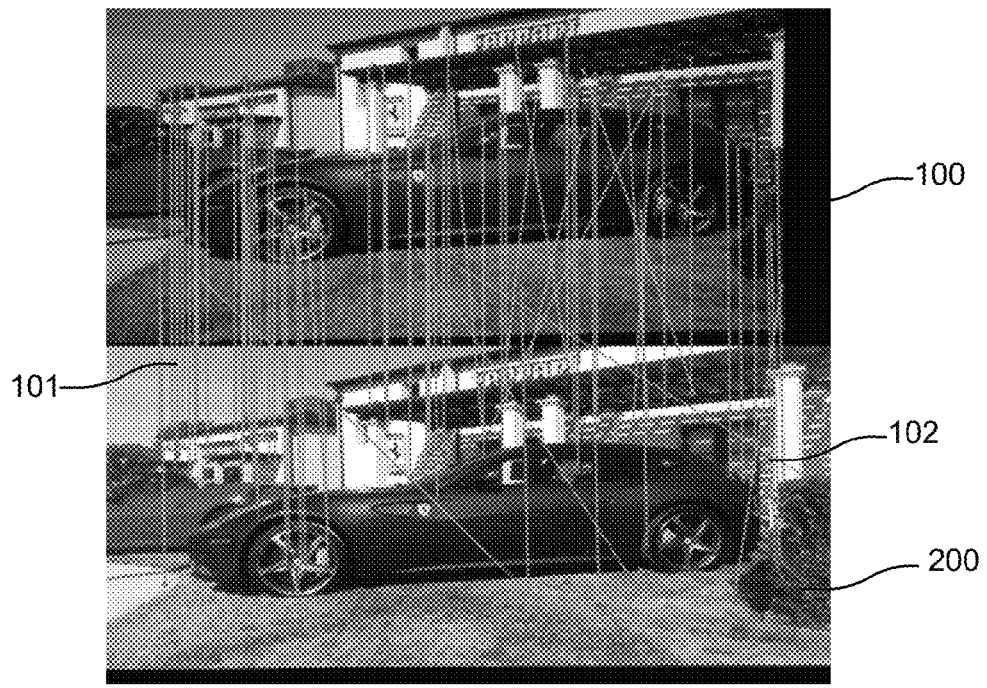
FIG. 3 is a diagram showing the feature point alignment from the first picture to the second picture determined by conventional feature point matching.

Also as mentioned, for a feature point from a reference camera image, the matching algorithm finds the corresponding feature point in other camera images regardless of changes in light, scale and other transformations. The simplest conventional matching algorithm is based on a brute-force approach which searches feature candidates point-by-point in the entire image. Currently, this brute-force approach is widely used in many applications despite its large computational loads. Furthermore, the original brute-force method may generate too many false matches between feature points in two different images. The false matches are noticeable when the distance between matched feature points are too distant or when the lines matching the feature points are not aligned with an epipolar line of the images when comparing the images. For two images from a multiple image array, the epipolar line may be considered to be the line connecting the centers of the rectified images, or more accurately the centers of the image sensors or cameras, when the two images are placed in the same plane for viewing for example. The epipolar direction is considered to be from the feature point on a reference image (or camera) toward the target image (or camera) where the search is to be conducted. Herein, the target image may also be referred to as the training image. For example, while referring to FIGS. 1-3, reference image 100 (FIG. 1) is captured by one camera of an array and being compared to image 200 taken by another camera of the array. FIG. 3 shows the comparison of the two images 100 and 200 side by side while placing both images (pictures) flat in the same plane, and shows a random 50 matches by drawing the lines 101 between each pair of matched feature points across the two images. Since the disparity of these two images is relatively small, the correct matches should have nearly vertical, parallel lines across the two images which would be parallel to the epipolar line. Thus, any oblique, non-parallel matching lines 102 indicate false matches.

By one conventional option, a homography matrix of two images is an approach to constrain the matching problem. However, the homography matrix process is only applicable if the scene is a planar structure. Also, overall, the quality and speed of all of the conventional approaches are not suitable for mobile applications.

A more efficient way of feature matching would be to use an epipolar constraint to limit the searching area near or on a single epipolar line instead of the whole image. However, in many cases, it is difficult or impossible to obtain estimates of precise epipolar lines due to the unknown positions of cameras, small shifts from the original camera positions, and/or inaccuracies in multi-image rectification.

To resolve these issues, an efficient and accurate method of sparse feature matching for camera calibration and disparity calculations for images taken by a camera array is described herein. This is accomplished by using local block searching alone or combined with the epipolar constraint based on a general direction of the epipolar line rather than a precise measurement. This local epipolar-based searching method outperforms previous approaches significantly in speed and provides good quality matching results.

For some devices, such as tablets with camera arrays, the positions of the cameras are relatively close to each other on the device, and the camera rotations are typically small. Thus, the differences in coordinates of matched features in different images should not be large so that a local search should be sufficient. Also, the relative positions of the cameras determine the emphasis of the search orientation. In other words, rectifying images effectively aligns the cameras that form the images so that the input images will have planes that coincide (lie in a common plane for example) which causes the epipolar direction to be parallel to the orientation of the two cameras. Therefore, the matches tend to be in camera orientation. For example, for the left-right positioned camera, the search orientation will be left-right. Therefore, global searching can be replaced with local searching combined with camera relative positions. Thus, the local searching area can be reduced further by using an epipolar constraint to optimize the feature matching compared to the original brute-force method.

Figure 4:
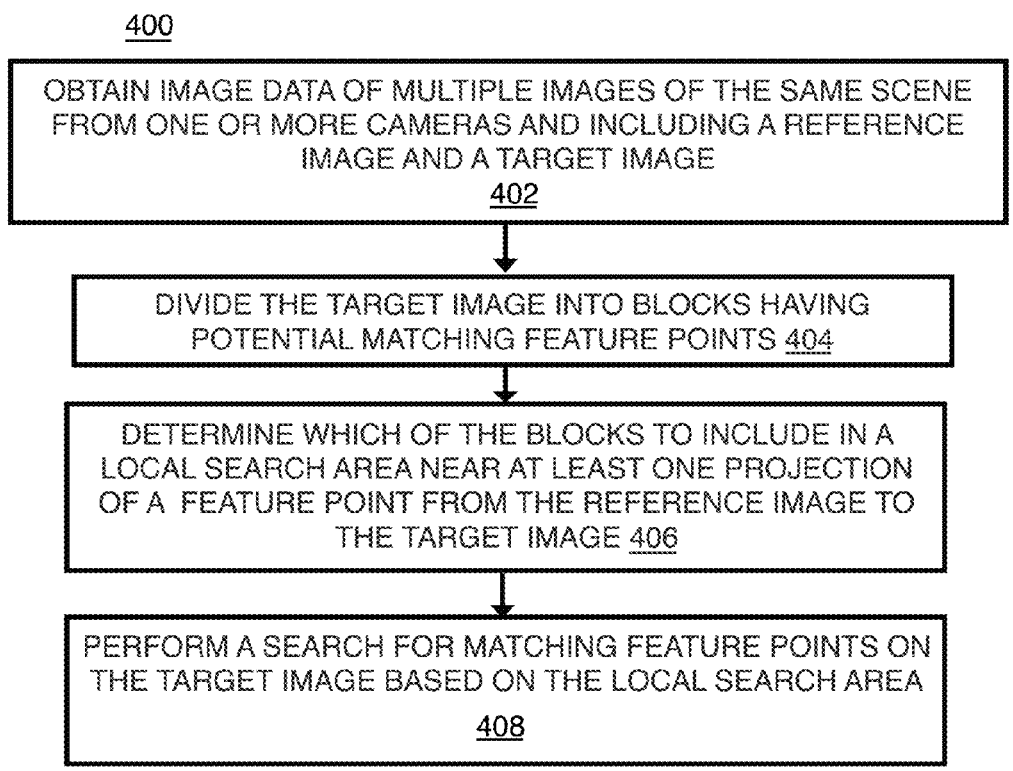
FIG. 4 is a flow chart of feature matching for a camera array.

Referring to FIG. 4, process 400 is provided for a method and system of feature point matching for multiple images. In the illustrated implementation, process 400 may include one or more operations, functions or actions 402 to 408 numbered evenly. By way of non-limiting example, process 400 may be described herein with reference to example image capture processing system 1800 of FIG. 18 respectively, and where relevant.

Process 400 may include "obtain image data of multiple images of the same scene from one or more cameras and including a reference image and at least one target image" 402. This includes multiple images from any device such as a smart phone, tablet, laptop computer and so forth that has a camera array on a single device. The present methods, however, also may apply to arrays established with separate cameras whether formed of dedicated separate cameras or separate devices with cameras. Otherwise, the process could also may apply to multiple images of a scene from a single camera that is moved about the scene to known positions for example. This operation also may include any pre-processing (relative to the feature matching operations) and initial rectification of the images as described below, so that the image data is ready for feature matching.

The process 400 also may include "divide the target image into blocks having potential matching feature points" 404. This may include dividing the target image into large blocks that may have many pixels each but a significant reduction compared to the entire image, such as dividing an image into 10×10 blocks by one example. Selecting the number of blocks may be based on many factors such as the image size and a disparity range between blocks on one image compared to the other and explained in detail below. This operation also may include selecting feature points that are placed on features in the images and selected so that the feature points are evenly spread among the blocks at least as much as possible also as explained below. It will be understood that the reference image may be divided into blocks as well and that correspond to the blocks on the target image in order to assist with the tracking of the points to be matched.

Process 400 then may include "determine which of the blocks to include in a local search area near at least one projection of a feature point from the reference image to the target image" 406. Particularly, this operation may include selecting blocks on a target image for a local search for a match of a feature point on a reference image. By one example, this will include a first, central, or main block on the target image that would include the projection of a feature point from the reference image and to the target image. The local area then may include blocks within a certain count of blocks from the first block. By one form, only blocks that contact the first block are included in the local search area with the first block. This may include all blocks in contact (such as eight blocks surrounding the first block including those touching diagonally) by one example. Many other examples exist.

By another option, process 400 may reduce the local search area to include just those blocks along the epipolar line between the images. Thus, the method may determine a match of at least one feature point on one of the images with at least one feature point of another of the images by performing a local epipolar-based search. To reduce the local search area in this way, the process may include an operation to determine a general direction of the epipolar line from reference camera to another camera of the array of cameras. Thus, if the cameras, and in turn the images, are next to each other along the same horizontal line, the epipolar line will be horizontal; when the images and cameras have a diagonal relationship, the epipolar line will be diagonal. Once the general direction of the epipolar line is established, a search area may be determined in the general direction of the epipolar line, which may include any block that intersects the epipolar line extending from the feature point on the reference image, and also may include any block immediately next to a block that is intersected. Again, many variations are possible.

The process 400 may include "perform a search for matching feature points on the target image based on the local search area" 408. For each feature point in a reference image, the local or local epipolar-based search method described herein searches features in the established small local area instead of the whole image, which significantly reduces the amount of computations.

Referring to FIG. 4A, a process 450 is provided for a method and system of feature point matching for multiple images. In the illustrated implementation, process 450 may include one or more operations, functions or actions 452 to 474 numbered evenly. By way of non-limiting example, process 450 may be described herein with reference to example image processing system 1800 of FIG. 18 respectively, and where relevant.

Process 450 may include "obtain image data from multiple images of the same scene" 452. As mentioned herein, the multiple images may be obtained from a single device with a multi-camera array, a multi-camera array formed from separate cameras or separate devices with one or more cameras, or even a single device or camera moved to take multiple images of a scene. The image data may be for still pictures, frames of a video sequence, or images for a preview screen for a one or more cameras on a camera array system. This operation also may include any pre-processing (relative to the feature matching operations) and rectification of the images so that the image data is not raw and is ready for feature matching. Such pre-processing may include noise reduction, pixel linearization, shading compensation, resolution reduction, Bayer demosaic, vignette elimination, and/or 3A related operations including automatic white balance (AWB), automatic focus (AF), and/or automatic exposure (AE), and so forth.

At least the image data should be rectified. The rectification is performed to transform the images from multiple cameras (or multiple images from a single camera), and therefore multiple angles, into a common plane to simplify the feature matching process. Such rectification is based on known transformation algorithms. The result is that the multiple images are now each viewed from the same perspective or angle so that the images can be placed in the same common plane, the points in the images are much more easily matched by parallel matching lines, and the epipolar direction can be indicated by the camera orientation which enables the optimization of reducing searching area by applying epipolar constraint as described herein.

Process 450 may include "determine block arrangement B to divide the image into blocks" 453. Particularly, at least the target image may be divided into large blocks of pixel data so that the local search area may be formed of these blocks. Otherwise, the search area may be smaller than the entire image to reduce the computational load and duration of the search. The blocks may be square or rectangular and by one form are divided into B×B blocks. A single block still may be relatively large with pixels numbered in the hundreds of thousands. By one example herein, B=5, and the target image is divide the image into 5×5 blocks for explanation of the methods herein. An image is divided into 10×10 blocks for testing described below as well. It will be understood that the reference image may be divided into blocks that match the block arrangement on the target image in order to assist with tracking the matching feature point pairs from reference image to target image since pairs are to be found in the same set of blocks that form a local and/or epi-polar search area.

By one form, the number of blocks depends on the image size and a maximum or range of disparity between the image data on the reference image to that on the target image. Generally, when a search is performed for a matching point, a point is compared one-by-one to a range of possible disparity values up to a maximum disparity value. The maximum disparity may be determined by manual methods such as by heuristics, and may be a fixed value for all images of the same scene and/or for all scenes optimized by experiments. By another alternative, however, maximum disparity may be determined for each scene or each image. Such a process is disclosed in U.S. patent application Ser. No. 14/565,149, filed Dec. 9, 2014, and issued as U.S. Pat. No. 9,674,505, issued on 6 Jun. 2017, and which is incorporated herein. For this alternative, feature descriptors are formed for sparse feature points detected by using difference of Gaussians, or fast corner detectors, and so forth. The feature detectors may be float or binary vectors depending in which descriptor is used such as fast retina keypoints (FREAK), binary robust invariant scalable keypoints (BRISK), scale invariant feature transform (SIFT), speed-up robust feature (SURF), or other such descriptors. The points are then matched by matching feature descriptors, and outliers are removed. The remaining maximum disparity is the maximum disparity for the disparity matching range. The value of the maximum disparity is taken as an input of an initial estimate feature matching algorithm. The blocks factor B depends on the width and height of the image and the maximum disparity value by:

$$B=\min(\text{width},\text{height})/\text{maximum disparity} \quad (1)$$

where width and height refers to the width and height of the image. The number of blocks (B×B) are set to increase the likelihood that a match will be found in the same or nearby blocks. Basically, for a certain feature point in a reference image, its match point is found by only searching the nearby blocks (the difference of a block index is less or equal to 1 in both x and y directions for example) in other image. The points in other blocks can be ignored since the distances between them and the reference point exceed the maximum disparity value.

Equation (1) also sets the size of each block, which will be the same (in number of pixels) for this feature matching process.

It will be understood that the block arrangement may be different from image-to-image in a sequence of images (such as with video or real time viewing). Thus, normally each pair or group (either taken at the same instant of a moving scene or of the same still scene for example) and of a sequence of images taken by the camera array may have a different maximum disparity value which results in a different block size. As stated above, block arrangement is determined by image size and estimated maximum disparity value from equation (1). Otherwise, the block arrangement may be fixed for multiple images (or in other words, a sequence of images taken by the camera array) that are deemed sufficiently alike if desired.

Process 450 may include "select feature points on target image based on feature point spread in image" 454, and actually, this may apply to the selection points on both the reference image and the target image. The number of feature points in a single block is not critical. Instead, spreading out the actual and potential feature points to be scattered throughout an image avoids biasing the matching in a local region of the image. A more spread out arrangement of feature points is beneficial in rectification tests, lens shift correction, and so forth. This is accomplished by selecting a certain number of features in each block (on both the reference and target images) with the largest response values (for example, the strongest indicators of a feature point such as a corner on an object). This is more likely to spread the feature points uniformly throughout the entire image frame.

Thus, potential matching feature points are chosen on the target image so that the number of feature points in each block is as uniform as possible. Feature points are usually an outer edge of an object in the content of the image, or may be some other noticeable part of the object such as where the color or shading changes or other noticeable feature. The feature points are based on changes in chroma or grey scale pixel values but could be based on luminance values as well. Also, the feature points are set based on known algorithms such as features from accelerated segment test (FAST), SIFT, SURF, and so forth. If there are not enough feature points in a block, all of the feature points are selected for matching in this block. If there are no feature points in a block (such as when a region of an image is the same uniform color as in a pure blue sky for example), then the number of feature points for that block is simply 0. The block is still included to form search areas except that the methods herein will simply ignore the block during feature matching since it has no feature points.

Process 450 may include "determine feature point block locations of N feature points on the reference image numbered 1 to N" 456. This operation comprises finding the feature points on the reference image, projecting those feature points to the target image (or projecting the blocks onto the reference image), and noting which block on the target image those projections extend into. The projections may extend parallel to the epipolar line or estimated epipolar line represented by a line center to center of the images. The block that includes the projection may be considered the first (or main or central) block for the local search area to be established around, and for that particular feature point on the reference image. It will be appreciated that there are alternative ways to extend the projection or to select a first block for each feature point on the reference image. By one form, the block location of each feature point, no matter in reference image or other image, is calculated by both the feature point coordinate and a block location index in the image as well as the block size. For example, if the image size is 1280*720 and block factor B is 10, which means there are 10*10 blocks in each image, each block size is 128*72. If the coordinate of a certain feature point in the reference image is (135, 155), its block location index is (1, 2). When searching its matched point in another image then, the block index is matched first, here with index (1, 2), and is taken as the central block for that feature point.

It will also be understood that feature points on the reference image that are in the same block (of a block projected from the target image to the reference image) will have the same local (and/or epipolar-based) search area on the target image. Thus, while the discussions for this process 450 may discuss operations in terms of a single feature point on the reference image to be matched, the operations and feature point comparison computations may be performed on a group of the feature points in a reference block that are compared to all of the potential matching feature points in the blocks of the search area on the target image. Accordingly, this operation may include determining groups of feature points that fall within the same block.

Process 450 may include "set n=0", and particularly to start or reset the count of feature points for a reference image so that the feature points are matched point by point until all (or a selected group) of the points are paired.

Process 450 may include "obtain feature point n+1" 460, which obtains the first feature point 1 from the reference image in this example since n=0.

Process 450 may include "determine blocks in local search area for feature point" 462. Basically, the disparity (pixel shift) of each feature point in different images of a camera array has an upper bound. Thus, the areas that are too distant from a target feature point is unlikely to have any true matches, and might even result in false matches. Therefore, the search is limited to local neighbor areas around the target feature point for the search.

This operation selects which blocks will form the local search area, and will be the final search area for a feature point on the reference image when epipolar-based searching is omitted. When epipolar-based searching will be used, this operation simply sets an initial local search area that will be reduced by the epipolar line operations described below. It will be understood, however, that while process 450 sets the search area for the pure local search and then reduction by the epipolar line analysis thereafter as a separate operation, these operations may be performed in fewer or condensed steps by immediately applying the local search setting rules while determining the epipolar line-based blocks.

To set the local search area regardless of the epipolar line, first the first or main block on the target image is obtained for the feature point 1 and as described above. Again, this is set as the center or anchor for the local search area. Thereafter, it is determined which surrounding blocks are to be included in the local search area. By one form, those blocks within a certain count of blocks away from the first block or in other words within a certain ring of blocks around the first block, may be included in the local search area. By one form, only the blocks that are adjacent or touching the first block (or those blocks in the closest ring around the first block) are considered part of the local search area.

Figures 7, 8, 9, 10:
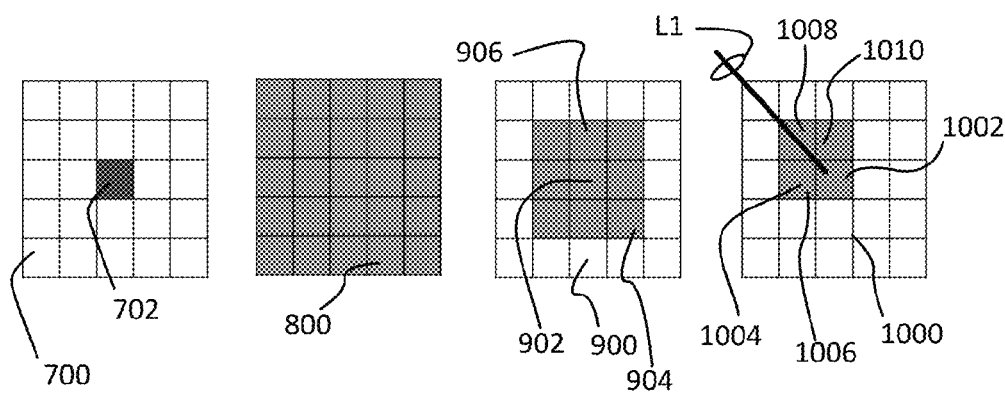
FIG. 7 is a schematic diagram of a reference image with a block with feature points to be matched.
FIG. 8 is a schematic diagram of a search area on a target image used with conventional feature matching.
FIG. 9 is a schematic diagram showing a search area on a target image used with a local search process as disclosed herein.
FIG. 10 is a schematic diagram showing a search area on a target image used with the local epipolar-based search process disclosed herein.
Figure 11:
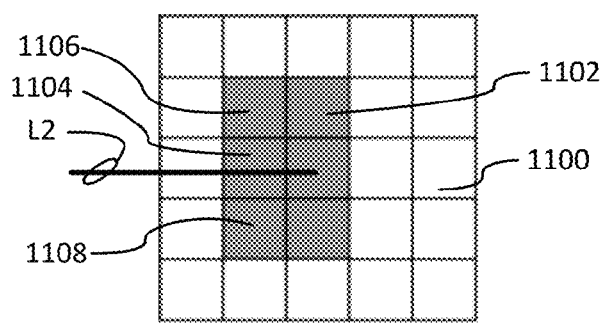
FIG. 11 is a schematic diagram showing another search area on a target image used with the local epipolar-based search process disclosed herein.

Referring to FIGS. 7-9 to provide an example of a local search area, a reference image 700 is shown with other target images 800 and 900. The images are divided into B×B blocks (including the reference image 700 to show the block-to-block correspondence with the target images) where B=5 for this example. FIGS. 10-11 relate to the epipolar line and will be discussed below.

Here, the reference image 700 is shown divided into the 25 blocks (5×5), and where a block 702 has feature points to be matched. Target or training image 800 shows a searching area by conventional brute-force approach where all the feature points of reference block 702 are compared to the feature points in each block of image 800. Thus, for each feature point in a block in the reference image, the search area for the original brute-force approach is the whole target image.

By another example, a corresponding first block 902 in another image 900 has the same relative position as the reference block 702. By applying a local search, the blocks 904 immediately surrounding (or adjacent or contacting) the corresponding first block 902 form the local search area 906 with the first block 902 by one example. As mentioned, other examples are possible such as searching within a certain number of blocks from the target block that is less than the entire image.

As mentioned, by combining an epipolar line constraint, the searching areas are further reduced from the pure local search area just described. With searching areas much smaller, the amount of computations are reduced and the performance is significantly improved. Thus, process 450 may include "determine general direction of epipolar line from the reference image to another image of the scene" 464. Also as mentioned above, when two images are rectified to occupy a common plane and are viewed as the two images lie flat in the common plane, the epipolar line is assumed to extend along the line from the center to center of the two images. The general direction is used because it is often difficult or impossible to determine the exact precise angle of the epipolar line as mentioned above.

Figure 5:
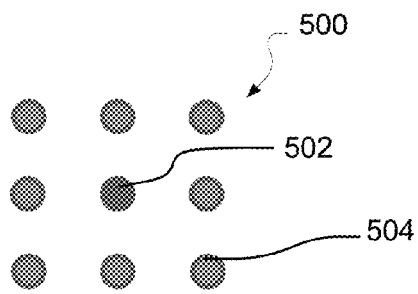
FIG. 5 is a schematic diagram showing an arrangement of a reference camera and other cameras of a camera array.

Referring to FIG. 5, a diagram of a camera array 500 is shown and includes a reference camera 502 surrounded by other cameras 504 to show the positioning of the reference camera relative to any of the other cameras, which also suggests the orientation of the cameras (e.g. the optical axes of the cameras) toward a common scene in or out of the paper as well as the angle or baseline from camera to camera which defines the epipolar line between each pair of cameras. This is the epipolar line of the rectified images when the images are placed relative to each other to represent the positions of their respective cameras. For each pair of any of the two cameras (or the reference camera and one of the surrounding cameras), eight possible orientations exist as shown in the example here, which may be used as eight possible general directions for the epipolar line extending from the center reference camera 502 to one of the other outer cameras 504.

Figure 6:
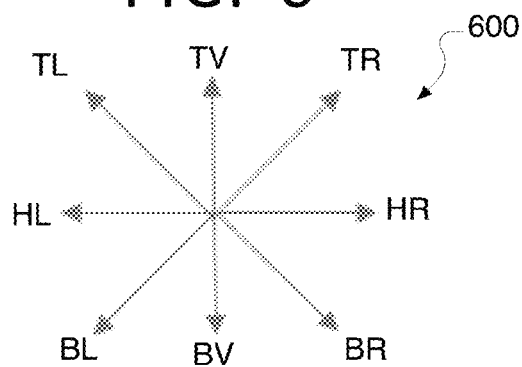
FIG. 6 is a schematic diagram to show the general directions of an epipolar line.

More specifically, and while referring to FIG. 6, each orientation (or position of the camera relative to another camera) of camera array 500 can be considered a general epipolar direction. A diagram 600 of the eight possible general directions of an epipolar line is shown and extending from a center (the reference camera or reference image) to another camera or target image. Another way to state this is that for two rectified images (pictures) that are positioned side-by-side, the epipolar line will run from the camera origin for one image (most likely the center of the image) to the origin of another image taken by another camera (or the same camera). The general direction as shown on diagram 600 may be from one camera or image origin to the upward or top vertical (TV), upward or top right (TR), right or horizontal right (HR), downward or bottom right (BR), downward or bottom vertical (BV), downward or bottom left (BL), left or horizontal left (HL), and upward or top left (TL). If the orientation or arrangement of two camera positions is known, the general or rough direction of the epipolar line also will be known. Thus, this operation process merely determines the general direction between images which may always be fixed on devices, such as the tablets with fixed position camera arrays. According to the epipolar constraint, the line between two matched feature points should be parallel to the epipolar line. Although in most cases there are no precise estimates of the direction of the epipolar line, the searching area can be reduced by determining the general epipolar direction. Specifically, for each feature point in a reference image, only the feature points in areas on, along or near the epipolar line direction are searched in the other image. By one form, this area further limits the area of the local search.

It will be appreciated that more or less than eight general directions may be used such as 16 and so forth, but as long as the number of general directions substantially or completely covers the local block area around a central block.

As mentioned, since the precise epipolar line is almost impossible to obtain due to the reasons mentioned above including the fact that the rectification process is imperfect, a rough epipolar direction is estimated instead. However, even is a precise epipolar line angle may become known, a general direction of the epipolar line still may be used. While using the exact epipolar line angle may form even smaller search areas with at least some greater accuracy, especially for larger images with a relatively larger amount of blocks or smaller sized blocks, the general direction is used, or actually assumed, in order to avoid unneeded computational load relative to the small increase in accuracy that might be gained.

Referring to FIGS. 10-11, process 450 may include "reduce local search area depending on the general direction" 466. Basically for an epipolar-based search area, the search area will include those blocks that intersect a line extending from the first block with the projection of the feature point being matched and in the same direction as the general direction of the epipolar line. Also, blocks adjacent to (or some other block-count distance) from the blocks that are being intersected are included in the epipolar-based search area. Since the general direction of the epipolar line is used rather than the precise angle of the epipolar line, blocks that are adjacent to those blocks being intersected are included in the search area since the actual epipolar line direction may be closer to the next general direction over. For example, an epipolar line extending to the horizontal left may actually extend closer to the top left, or bottom left instead. Thus, to better ensure that the correct potential matching feature points are still included in the search area, an extra layer or ring of blocks are included in the search area.

As an example, another image 1000 determines a searching area 1002 by combining and applying both a local search and the general epipolar direction (or epipolar constraint or epipolar-based search) such that the search is limited to an area within the local search area that is on or adjacent to (or some predetermined number of blocks from) a line that extends in the same general direction as the epipolar line extends in, which here for image 1000 would be to the upper left. Here, "same general direction" refers to an extending line L1 being parallel to, or at least generally parallel to, the epipolar line even though the extending line L1 may extend from a block on the target image that is not the center of the image while the epipolar line does extend from the center of the image. In other words, the line L1 may extend in the same direction no matter which block on image 1000 is the first block. When the general or rough epipolar line direction is toward or at upper or top left (or running diagonally from the center of the image) and toward the upper and left direction (TL shown in FIG. 6), in this case, at most 4 blocks are searched for the feature points and form the local epipolar-based search area 1004 since the blocks are limited to (1) the first block 1002 with the projection of the feature point being searched, (2) the blocks adjacent the first block by the local search area limits, and (3) the blocks intersected by, or next to blocks intersected by, a line L1 extending from the first block that is in the same general direction as the epipolar line for the reference and target images. These last two limits add to (or rather maintain) the other three blocks 1006 and 1108, and 1010 in the local epipolar-based search area 1004 when the epipolar line extends to the upper left. A similar four block local epipolar-based search area scenario occurs when the general epipolar line directions are diagonal and extend to the top right, bottom left, and bottom right except positioned closer to the respective corner of the direction of the epipolar line.

By another example, the general direction of the epipolar line may be vertical or horizontal. An epipolar line extends in a horizontal left general direction for an example image 1100 (FIG. 11), which means that the extending line L2 also extends in the horizontal left direction. The searching area 1102 in image 1100 is six blocks with one row of two blocks 1104 that intersects the line L2 that extends in the same general direction as the horizontal epipolar line, and then one row 1106 above and one row 1108 below since these blocks are adjacent the intersected row. Therefore, there are at most six blocks searched whenever an epipolar line direction is vertical or horizontal (and only the adjacent blocks are included). On a larger image, or with smaller blocks, more blocks within a certain block count of the line L2 or the first block may be added to the search area that is more than adjacent blocks but less than the entire image.

It will be understood that instead of discussing the establishment of the epipolar-based search area based on blocks that intersect a line, it can also be viewed as including a row or column of blocks in a direction of the epipolar line, and blocks within a certain number of blocks away from that row or column. Similarly, when the epipolar line is at a diagonal (which here is limited to some multiple of 45 degrees), the epipolar search area may include those blocks also along the diagonal (where the corners of the block intersect in an array of blocks), and those blocks adjacent the diagonal array of blocks. Whether speaking in terms of rows and columns, or line intersection, the same search area can result.

Figures 12, 13, 14:
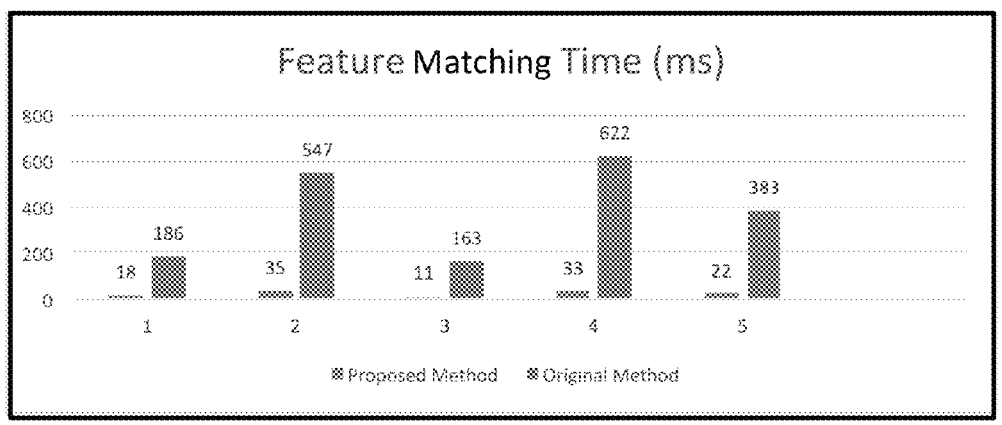
FIG. 12 is a schematic diagram showing a search scheme on a target image for a camera arrangement with an epipolar line with a top left general direction.
FIG. 13 is a schematic diagram showing a search scheme on a target image for a camera arrangement with an epipolar line with a horizontal left general direction.
FIG. 14 is table comparing conventional and present feature matching speed of feature matching.

Referring to FIGS. 12-13, the advantageous reduction in the count of feature point comparisons can be determined. It may be assumed from the examples herein that the reference and train (or target) images are divided into 5×5 blocks, and there are N total feature points in the reference image to be matched (counting all reference blocks in the reference image), M total feature points in the other target image(s) that are the potential matching feature points, and assuming all feature points are equally distributed in each block. In this example case, assume two cases of the epipolar line direction are used: top left for image 1200, and horizontal left for image 1300. The number shown in each block of target images 1200 and 1300 indicates the number of searching blocks to be included in the local epipolar-based search area for reference feature points in a corresponding block on the reference image that are projected to that block shown on the target image 1200 or 1300. In other words, the block on the images 1200 or 1300 shows the number of blocks included in the search area when the block shown is the first block. For example, in image 1200, each block that has a 4 has 4 blocks in its search area for the feature points in the corresponding block of the reference image. The blocks at the upper and left side of the image 1200 with a 1 or 2 will have less blocks in their search areas when the general direction of the epipolar line is to the upper left. Similarly for target image 1300 with an epipolar line to the horizontal left will have a search area that includes 6 blocks for an interior block but only 2, 3, or 4 blocks in the search area for those blocks along the left, upper, or lower edge of the image 1300.

Thus, for the example of images 1200 and 1300, the number of computations for comparing each pair of blocks between a reference and the other image is:

$$\frac{1}{25}N \times \frac{1}{25}M = \frac{1}{625}NM,$$

so the total amount of computations for image 1200 with an epipolar line direction at top left is:

$$(1 + (2 \times 8) + (4 \times 16)) \times \frac{1}{625}NM = \frac{81}{625}NM \text{ per image}$$

and the image 1300 with epipolar line direction at horizontal left is:

$$((2 \times 2) + (3 \times 4) + (4 \times 8) + 6 \times 12) \times \frac{1}{625} NM = \frac{120}{625} NM \text{ per image}$$

Compared with NM which is the amount of computations in an original brute-force match where the search for feature points in each block of the reference image is performed for each block in the training image, the local matching approach improves the speed significantly.

Process 450 may include "determine a match between a feature point in a reference image and a point in the local search area of another image" 468. Thus, this operation includes the actual comparison algorithms where each feature point on the reference image is compared to each potential matching feature point within the determined search area on the target image. By one form, the reference feature point is matched to the target feature point that has the lowest disparity in position or coordinates (counted by pixels x and y for example, and referred to as a hamming number).

By other alternatives, the reference feature point is matched to the target feature point that has the smallest Hamming distance between two feature description vectors, rather than the lowest disparity in position. This operation may include storing a description vector for each reference feature point and to describe the feature which may include disparity by x and y pixel count, size, angle, and other data for example. The description vectors can then be accessed and used instead of, or in addition to, the feature point pair identification. By one form, the description vectors may be 512 bits each. Providing such feature descriptions is a common process before the feature matching. The smaller the Hamming distance of two feature vectors, the more similar the two feature points. This simplifies the calculation in finding matched points.

Process 450 may include "set n=n+1" 470, which advances the feature point count to the feature point that was just analyzed.

Process 450 then may include a test "n=N?" to determine whether all of the feature points in the image have been matched. If not, the process loops to operation 460 to obtain the next feature point as explained above, and to perform a search to match the reference feature point to a potential matching feature point on the target image.

If all (or some desired number or particular ones) of the feature points are matched, the process may continue with "provide matched pairs" 474, and provide the pairs to applications that may calibrate the cameras, perform depth computations, calculating motion matrix, and so forth. This operation also may include providing the description vectors of the points.

It will be appreciated that while the methods herein mainly have been discussed in terms of a camera array with multiple cameras, the methods may work equally well when a single camera provides images of the same scene but from different known positions.

Referring to FIG. 14, experiments have shown that the performance of the described local search method is 10-20 times faster than the original method where the images are divided into 10×10 blocks for the method. Table 1400 is provided for this comparison, and shows five different possible scenarios and the microseconds elapsed for both the local epipolar-based search and the conventional search.

Referring to FIGS. 15-16, since the original brute-force match searches all the features in the other (or training) image, this may result in generating false matches whose features are too distant from each other (referred to as distance) and/or do not align with the epipolar line direction (referred to as alignment). This is shown by comparing the images 100 and 200 matched (by matching lines 1500) in FIGS. 15-16 with the disclosed method herein to the matching of the images 100 and 200 by conventional matching lines 102 in FIG. 3 where the non-parallel lines 102 are false matches.

Referring to FIG. 17, a table 1700 is provided to compare the false match rate in five experiments where the disclosed method has significantly reduced false match rates compared to the conventional brute-force method. Results showed that the false match rate of the disclosed local-epipolar method is low (below 5%) while the original brute-force method generates around 15%-25% false matches. These false matches will have a large impact on the matching quality and may cause inaccurate results of subsequent calculations and application operations such as camera calibration, disparity calculation, etc. The disclosed local epipolar-based search method and system can reduce the two causes (distance and alignment) of false matches effectively, and therefore improve the matching quality.

Overall, the disclosed local epipolar-based search method outperforms the original method both in speed and quality.

In addition, any one or more of the operations of FIGS. 4 and 4A may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 18:
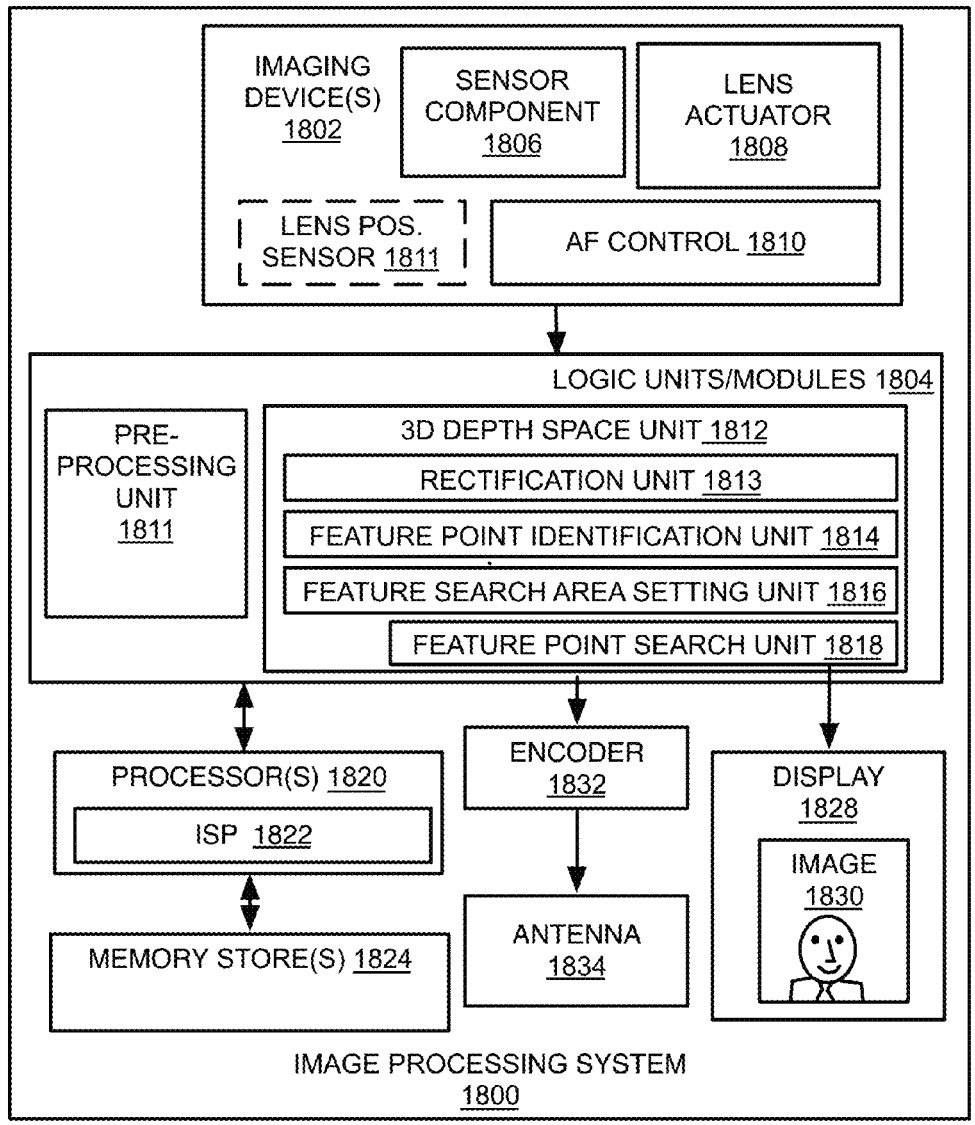
FIG. 18 is an illustrative diagram of an example system.

Referring to FIG. 18, an example image processing system 1800 is arranged in accordance with at least some implementations of the present disclosure. In various implementations, the example image processing system 1800 may have an imaging device 1802 to form or receive captured image data. This can be implemented in various ways. Thus, in one form, the image processing system 1800 may be one or more digital cameras or other image capture devices, and imaging device 1802, in this case, may be the camera hardware and camera sensor software, module, or component 1804. In other examples, imaging processing system 1800 may have an imaging device 1802 that includes or may be one or more cameras, and logic modules 1804 may communicate remotely with, or otherwise may be communicatively coupled to, the imaging device 1802 for further processing of the image data.

Thus, image processing device 1800 may be a single camera on a multi-camera device such as a smartphone, tablet, laptop, or other mobile device. Otherwise, device 1800 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1802 may include camera hardware and optics including one or more sensors as well as auto-focus, zoom, aperture, ND-filter, auto-exposure, flash, and actuator controls. These controls may be part of a sensor module or component 1806 for operating the sensor. The sensor component 1806 may be part of the imaging device 1802, or may be part of the logical modules 1804 or both. Such sensor component can be used to generate images for a viewfinder and take still pictures or video. The imaging device 1802 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1802 may be provided with an eye tracking camera.

The imaging device 1802 also may have a lens actuator 1808 that has a lens and a lens driver or driver logic that receives commands to move the lens and applies an electrical current to move the lens. Optionally, the imaging device 1802 also may have an autofocus control 1810 and a lens position sensor 1811 to confirm lens positions if needed.

In the illustrated example, the logic modules 1804 may include a pre-processing unit 1811 that receives and modifies raw image data for further processing and as described above. The logic modules also may include a 3D depth space unit 1812 that, in turn, includes a rectification unit 1813 that rectifies multiple pre-processed images of the same scene and from multiple cameras or from a single camera, also as already described herein. The 3D depth space unit 1812 also has a feature point identification unit 1814 to identify the feature points in the images, and a feature search area setting unit 1816 that sets a search area on target images relative to a reference image for searching for feature points, and according to the local search area or epipolar-based search area or both methods described herein. Also, a feature point search unit 1818 is provided to perform the search to determine matching feature points on the multiple images. The matches then may be used to form 3D coordinates for the points to form a 3D or depth space that can be used by many different applications. Any combination of the units of the logic modules 1804 may be operated by, or even entirely or partially located at, processor(s) 1820, and which may include an ISP 1822. The logic modules 1804 may be communicatively coupled to the components of the imaging device 1802 in order to receive raw image data that includes data to establish the feature points. Optionally, the feature point related data may be provided by a data stream separate from the raw image data stream. In these cases, it is assumed the logic modules 1804 are considered to be separate from the imaging device. This need not be so, and the logic modules very well may be considered to be part of the imaging device as well.

The image processing system 1800 may have one or more processors 1820 which may include a dedicated image signal processor (ISP) 1822 such as the Intel Atom, memory stores 1824 which may or may not hold feature point and search area setting data mentioned herein, one or more displays 1828 to provide images 1830, encoder 1832, and antenna 1834. In one example implementation, the image processing system 100 may have the display 1828, at least one processor 1820 communicatively coupled to the display, and at least one memory 1824 communicatively coupled to the processor. The encoder 1832 and antenna 1834 may be provided to compress the modified image date for transmission to other devices that may display or store the image. It will be understood that the image processing system 1800 also may include a decoder (or encoder 1832 may include a decoder) to receive and decode image data for processing by the system 1800. Otherwise, the processed image 1830 may be displayed on display 1828 or stored in memory 1824. As illustrated, any of these components may be capable of communication with one another and/or communication with portions of logic modules 1804 and/or imaging device 1802. Thus, processors 1820 may be communicatively coupled to both the image device 1802 and the logic modules 1804 for operating those components. By one approach, although image processing system 1800, as shown in FIG. 18, may include one particular set of blocks or actions associated with particular components or modules, these blocks or actions may be associated with different components or modules than the particular component or module illustrated here.

Figure 19:
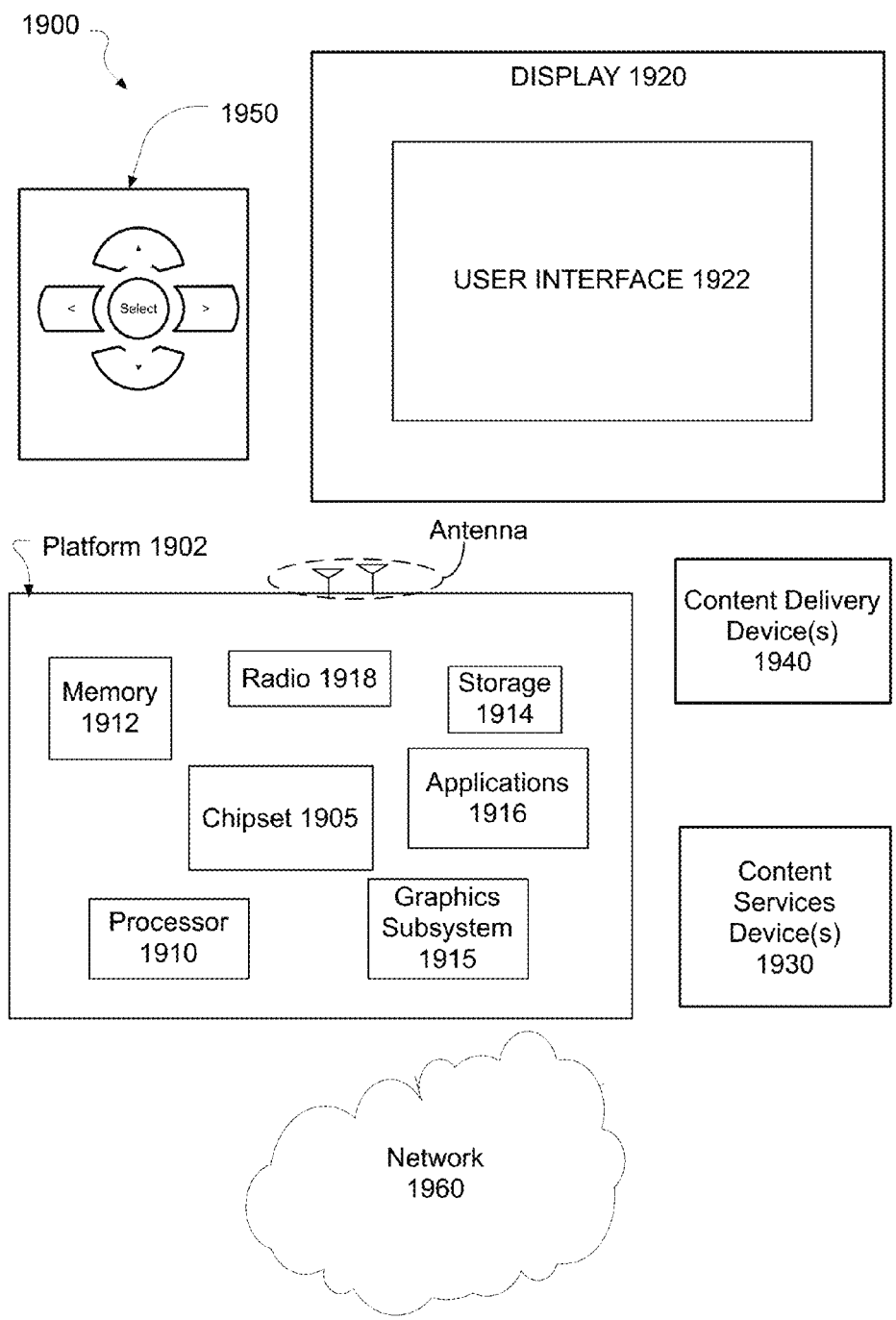
FIG. 19 is an illustrative diagram of another example system.

Referring to FIG. 19, an example system 1900 in accordance with the present disclosure operates one or more aspects of the image processing system described herein. It will be understood from the nature of the system components described below that such components may be associated with, or used to operate, certain part or parts of the image processing system 1800 described above. In various implementations, system 1900 may be a media system although system 1900 is not limited to this context. For example, system 1900 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone card communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of unidirectionally or bidirectionally 462 communicating content between content providers and platform 1902 and/display 1920, via network 1960 or directly. It will be appreciated that the content may be communicated unidirectionally and/or bidirectionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In implementations, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In implementations, controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various implementations, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various implementations, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
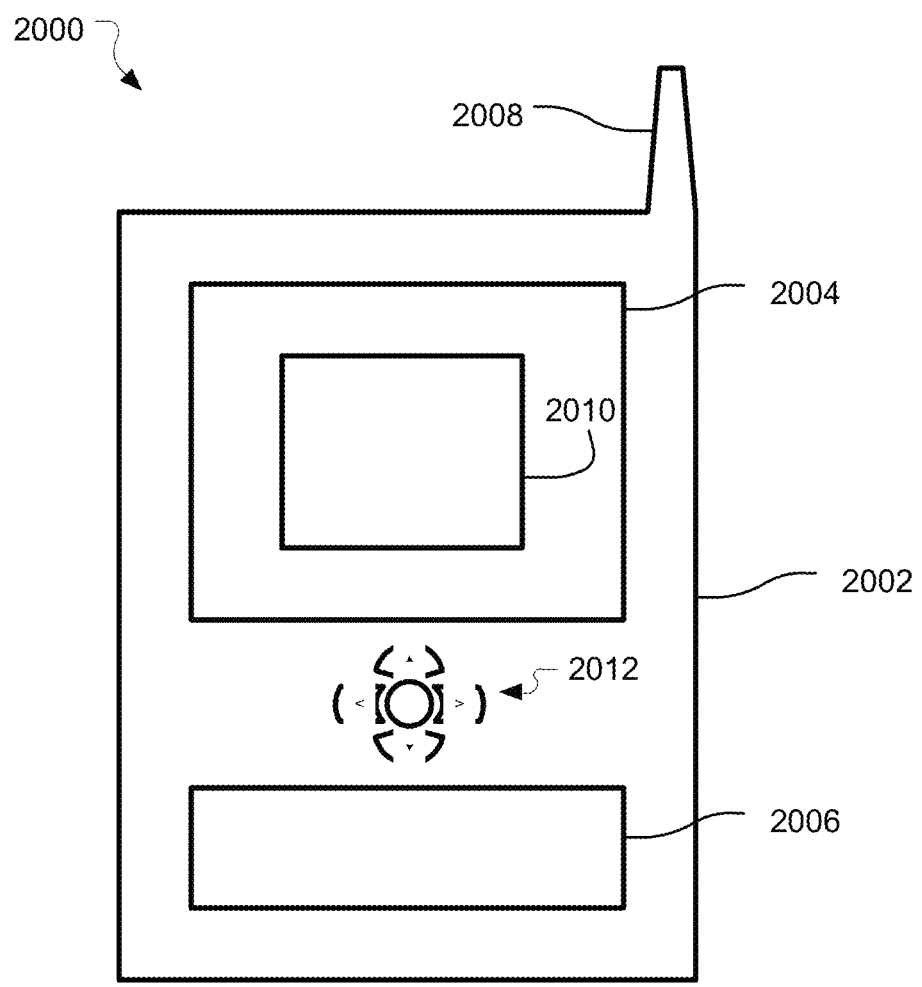
FIG. 20 illustrates another example device, all arranged in accordance with at least some implementations of the present disclosure.

Referring to FIG. 20, a small form factor device 2000 is one example of the varying physical styles or form factors in which system 1800 and/or 1900 may be embodied. By this approach, device 2000 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 20, device 2000 may include a housing 2002, a display 2004 including a screen 2010, an input/output (I/O) device 2006, and an antenna 2008. Device 2000 also may include navigation features 2012. Display 2004 may include any suitable display unit for displaying information appropriate for a mobile computing device. I/O device 2006 may include any suitable I/O device for entering information into a mobile computing device. Examples for I/O device 2006 may include an alphanumeric keyboard, a numeric keypad, a touch pad, input keys, buttons, switches, rocker switches, microphones, speakers, voice recognition device and software, and so forth. Information also may be entered into device 2000 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of feature matching for multiple images comprises obtaining image data of multiple images of the same scene from one or more cameras and including a reference image and at least one target image, and dividing the target image into blocks having potential matching feature points. The method also includes determining which of the blocks to include in a local search area near at least one projection of a feature point from the reference image and to the target image, and performing a search for matching feature points on the target image based on the local search area.

By another implementation, the method may include forming the local search area only of a first block that includes the projection of the feature point from the reference image and blocks that are adjacent the first block; reducing the local search area depending on a general direction of an epipolar line formed by the reference and target images; forming the local search area only of the blocks that intersect a line extending in the same general direction that the epipolar line extends in, and from the first block that includes the projection of the feature point from the reference image to the target image; forming the local search area only of the blocks that intersect a line extending in the same general direction that the epipolar line extends in, and from the first block that includes the projection of the feature point from the reference image to the target image and blocks adjacent the blocks that intersect; dividing the target image into blocks comprising using a disparity range value and the size of the image; and selecting the feature points in the blocks to be distributed generally uniformly in the entire image frame.

By yet another method, the method may include obtaining image data of multiple images of the same scene from one or more cameras and including a reference image and at least one target image; determining an epipolar-based search area with potential matching feature points on the target image to match a feature point from the reference image, and comprising forming the epipolar-based search area depending on an epipolar line formed by the reference and target images; and performing a search for matching feature points on the target image based on the epipolar-based search area.

By another implementation, this method may comprise determining the general direction of the epipolar line, and forming the epipolar-based search area depending on the general direction; forming the epipolar-based search area to comprise a region of the target image that intersects or is near a line projecting from a point on the target image that is a projection of the feature point from the reference image, and extending in the same general direction that the epipolar line extends in; wherein the general directions comprise upward, downward, left, right, upward left, upward right, downward left, and downward right; wherein the target image is divided into a number of blocks and the epipolar-based search area is formed by including an arrangement of blocks in the epipolar-based search area; and forming a local epipolar-based search area only of a first block that includes the projection of the feature point from the reference image, and block(s) that are both (1) adjacent the first block and (2) either intersect a line extending in the same general direction that the epipolar line extends in, and from the first block, or are adjacent a block(s) that intersects the extending line.

By a further implementation, a computer-implemented system of feature matching for multiple images comprises a display; at least one processor communicatively coupled to the display; at least one memory communicatively coupled to at least one processor; and a 3D depth space unit operated by the processor and to: obtain image data of multiple images of the same scene from one or more cameras and including a reference image and at least one target image; divide the target image into blocks having potential matching feature points; determine which of the blocks to include in a local search area near at least one projection of a feature point from the reference image and to the target image; and perform a search for matching feature points on the target image based on the local search area.

As another alternative, the system's 3D depth space unit may be provided to form the local search area only of a first block that includes the projection of the feature point from the reference image and blocks that are adjacent the first block; reduce the local search area depending on a general direction of an epipolar line formed by the reference and target images; form the local search area only of the blocks that intersect a line extending in the same general direction that the epipolar line extends in, and from the first block that includes the projection of the feature point from the reference image to the target image; form the local search area only of the blocks that intersect a line extending in the same general direction that the epipolar line extends in, and from the first block that includes the projection of the feature point from the reference image to the target image and blocks adjacent the blocks that intersect; divide the target image into blocks comprising using a disparity range value and the size of the image; and select the feature points in the blocks to be distributed generally uniformly in the entire image frame.

As another implementation, a computer-readable medium having stored thereon instructions that when executed cause a computing device to: obtain image data of multiple images of the same scene from one or more cameras on a device and including a reference image and at least one target image; divide the target image into blocks having potential matching feature points; determine which of the blocks to include in a local search area near at least one projection of a feature point from the reference image and to the target image; and perform a search for matching feature points on the target image based on the local search area.

As another option, the instructions execute the computing device to: form the local search area only of a first block that includes the projection of the feature point from the reference image and blocks that are adjacent the first block; reduce the local search area depending on a general direction of an epipolar line formed by the reference and target images; form the local search area only of the blocks that intersect a line extending in the same general direction that the epipolar line extends in, and from the first block that includes the projection of the feature point from the reference image to the target image; form the local search area only of the blocks that intersect a line extending in the same general direction that the epipolar line extends in, and from the first block that includes the projection of the feature point from the reference image to the target image and blocks adjacent the blocks that intersect; divide the target image into blocks comprising using a disparity range value and the size of the image; and select the feature points in the blocks to be distributed generally uniformly in the entire image frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of feature matching for multiple images, comprising:
    obtaining image data of multiple images of the same scene from one or more cameras and including a reference image and at least one target image;
    dividing the target image into blocks having potential matching feature points;
    determining which of the blocks to include in a local search area near at least one projection of a feature point from the reference image and to the target image comprising:
        reducing the local search area depending on a general direction of an epipolar line formed by the reference and target images, and
        forming the local search area only of the blocks that intersect a line extending in the same general direction that the epipolar line extends in, and from a first block that includes the projection of the feature point from the reference image to the target image; and
    performing a search for matching feature points on the target image based on the local search area.

2. The method of claim 1 comprising forming the local search area only of the first block that includes the projection of the feature point from the reference image and blocks that are adjacent the first block.

3. The method of claim 1 comprising forming the local search area of blocks adjacent the blocks that intersect.

4. The method of claim 1 comprising additionally forming the local search area of blocks that are at least one of: (1) a predetermined number of blocks from the first block that is less than the outer edge of the image, and (2) blocks that are a predetermined number of blocks from a block that intersects the line extending from the first block.

5. The method of claim 1 comprising dividing the target image into blocks comprising using a disparity range value and the size of the image.

6. The method of claim 1 comprising selecting the feature points in the blocks to be distributed uniformly in the entire image frame.

7. The method of claim 1 comprising:
    additionally forming the local search area of blocks adjacent the blocks that intersect;
    dividing the target image into blocks comprising using a disparity range value and the size of the image; and
    selecting the feature points in the blocks to be distributed generally uniformly in the entire image frame.

8. A computer-implemented method of feature matching for multiple images, comprising:
    obtaining image data of multiple images of the same scene from one or more cameras and including a reference image and at least one target image;

determining an epipolar-based search area with potential matching feature points on the target image to match a feature point from the reference image, and comprising forming the epipolar-based search area depending on an epipolar line formed by the reference and target images and comprising:

dividing the target image into a number of blocks, including an arrangement of blocks in the epipolar-based search area, determining a general direction of the epipolar line, and forming the epipolar-based search area depending on the general direction, and forming the epipolar-based search area of the blocks that intersect a line extending in the same general direction that the epipolar line extends in, and extending from a first block that includes the projection of the feature point from the reference image to the target image; and performing a search for matching feature points on the target image based on the epipolar-based search area.

9. The method of claim 8 wherein the general directions comprise upward, downward, left, right, upward left, upward right, downward left, and downward right.

10. The method of claim 8 comprising further forming the epipolar-based search area of block(s) adjacent the block(s) that intersect.

11. The method of claim 8 comprising further forming the local epipolar-based search area of block(s) that are either (1) adjacent the first block and (2) adjacent a block(s) that intersects the extending line.

12. A computer-implemented system of feature matching for multiple images, comprising: a display;

at least one processor communicatively coupled to the display; at least one memory communicatively coupled to at least one processor; and a 3D depth space unit operated by the processor and to:
obtain image data of multiple images of the same scene from one or more cameras and including a reference image and at least one target image;

divide the target image into blocks having potential matching feature points;

determine which of the blocks to include in a local search area near at least one projection of a feature point from the reference image and to the target image comprising:

reducing the local search area depending on a general direction of an epipolar line formed by the reference and target images, and forming the local search area only of the blocks that intersect a line extending in the same general direction that the epipolar line extends in, and from a first block that includes the projection of the feature point from the reference image to the target image; and perform a search for matching feature points on the target image based on the local search area.

13. The system of claim 12 comprising:
additionally form the local search area of blocks adjacent the blocks that intersect;

divide the target image into blocks comprising using a disparity range value and the size of the image; and select the feature points in the blocks to be distributed generally uniformly in the entire image frame.

14. A computer-readable medium having stored thereon instructions that when executed cause a computing device to:

obtain image data of multiple images of the same scene from one or more cameras and including a reference image and at least one target image;

divide the target image into blocks having potential matching feature points;

determine which of the blocks to include in a local search area near at least one projection of a feature point from the reference image and to the target image comprising:

reducing the local search area depending on a general direction of an epipolar line formed by the reference and target images, and forming the local search area only of the blocks that intersect a line extending in the same general direction that the epipolar line extends in, and from a first block that includes the projection of the feature point from the reference image to the target image; and perform a search for matching feature points on the target image based on the local search area.

15. The computer-readable medium of claim 14 wherein the instructions cause the computing device to:

additionally form the local search area of blocks adjacent the blocks that intersect;

divide the target image into blocks comprising using a disparity range value and the size of the image; and select the feature points in the blocks to be distributed generally uniformly in the entire image frame.

* * * * *